United States Patent
Löschei

(10) Patent No.: US 11,027,216 B2
(45) Date of Patent: Jun. 8, 2021

(54) ROTARY EVAPORATOR HAVING A FILTER

(71) Applicant: Hans Heidolph GmbH, Kelheim (DE)

(72) Inventor: Robert Löschei, Fürth (DE)

(73) Assignee: Hans Heidolph GmbH & Co. KG, Kelheim (DE)

(*) Notice: Subject to any disclaimer, the term of this patent is extended or adjusted under 35 U.S.C. 154(b) by 0 days.

(21) Appl. No.: 16/478,085

(22) PCT Filed: Nov. 27, 2017

(86) PCT No.: PCT/EP2017/080513
§ 371 (c)(1),
(2) Date: Sep. 4, 2019

(87) PCT Pub. No.: WO2018/130334
PCT Pub. Date: Jul. 19, 2018

(65) Prior Publication Data
US 2019/0388797 A1  Dec. 26, 2019

(30) Foreign Application Priority Data
Jan. 16, 2017  (DE) ...................... 10 2017 100 752.0

(51) Int. Cl.
B01D 3/10 (2006.01)
B01D 1/30 (2006.01)
B01D 3/08 (2006.01)

(52) U.S. Cl.
CPC ................. *B01D 3/10* (2013.01); *B01D 1/30* (2013.01); *B01D 3/085* (2013.01)

(58) Field of Classification Search
CPC ............. B01D 1/30; B01D 3/085; B01D 3/10
See application file for complete search history.

(56) References Cited

U.S. PATENT DOCUMENTS

| 3,400,747 A | * | 9/1968 | Genser | ...................... B01L 3/00 159/23 |
| 4,285,775 A | * | 8/1981 | Hamann | .................. B01D 3/00 202/160 |
| 5,628,969 A | * | 5/1997 | Aulbaugh | .............. B01D 3/085 422/616 |

(Continued)

FOREIGN PATENT DOCUMENTS

| CN | 205850257 U | 1/2014 |
| CN | 205850874 U | 1/2017 |

(Continued)

OTHER PUBLICATIONS

Büchi: "Laboratory Evaporation Glassware", Nov. 8, 2016, XP055450598, URL: https://web.archive.org/web/20180212155523if:/ http://static1.buchi.com/sites/default/files/downloads/Laboratory_Evaporation_Glassware_Solutions_en_C_0.pdf?9a647f92cc55c9b1c6766ea40642ee35eef3abe2.

(Continued)

*Primary Examiner* — Jonathan Miller
(74) *Attorney, Agent, or Firm* — Wiggin and Dana LLP; Gregory S. Rosenblatt; Rikesh P. Patel

(57) ABSTRACT

The invention relates to a rotary evaporator having a rotary drive, having an evaporator flask rotatable about an axis of rotation by the rotary drive, having a vapor tube, and having a glass structure adjoining the vapor tube in the direction of vapor flow, wherein a filter connected upstream of the glass structure, in particular upstream of the vapor tube, is provided for filtering solids from a vapor flow.

17 Claims, 2 Drawing Sheets

(56) References Cited

U.S. PATENT DOCUMENTS

| | | | |
|---|---|---|---|
| 5,746,987 A | 5/1998 | Aulbaugh et al. | |
| 6,709,025 B2* | 3/2004 | Spring | B01D 3/085 |
| | | | 285/231 |
| 2003/0141177 A1 | 7/2003 | Countz | |
| 2008/0035467 A1 | 12/2008 | Torii et al. | |
| 2010/0193345 A1* | 8/2010 | Carl | B01D 3/085 |
| | | | 202/238 |
| 2014/0144767 A1* | 5/2014 | Jost | B01D 3/02 |
| | | | 203/2 |
| 2014/0238620 A1* | 8/2014 | Hauser | B01D 1/228 |
| | | | 159/11.1 |
| 2017/0113159 A1* | 4/2017 | Carl | B01D 3/085 |
| 2017/0209805 A1* | 7/2017 | Dil | F16L 37/122 |

FOREIGN PATENT DOCUMENTS

| | | |
|---|---|---|
| DE | 3902370 A1 | 8/1990 |
| DE | 102014110343 A1 | 1/2016 |
| EP | 2275183 A1 | 1/2011 |

OTHER PUBLICATIONS

Anonymous: "Rotavapor R-300 | buchi.com", Nov. 8, 2016, XP055450528, URL: https://web.archive.org/web/20161108184102/https://www.buchi.com:80bx-en/products/laboratory-evaporation/rotavapor-r-300.

* cited by examiner

ROTARY EVAPORATOR HAVING A FILTER

CROSS-REFERENCE TO RELATED APPLICATIONS

This application is a National Stage entry of PCT/EP2017/080513, filed Nov. 27, 2017, which claims the benefit of priority to German Patent Application No. 10 2017 100 752.0, filed Jan. 16, 2017, the entireties of which are herein incorporated by reference.

TECHNICAL FIELD

The present invention relates to a rotary evaporator having a rotary drive, having an evaporator flask rotatable about an axis of rotation by the rotary drive, having a vapor tube, in particular led through the rotary drive, and having a glass structure adjoining the vapor tube in the direction of the vapor flow.

BACKGROUND

Rotary evaporators are pieces of laboratory equipment that are used for evaporating distillates such as solvents. The evaporator flask fastened to the rotary drive is typically heated by means of a heating bath, a heating mantle, a heating dish, or a heating container. The evaporator flask is uniformly heated due to the rotation and a thin liquid film which has a large surface and from which the distillate can be evaporated fast, efficiently and gently is produced at the heated inner wall of the evaporator flask. The evaporated distillate flows via a vapor passage into a cooler of the rotary evaporator to condense there. The condensate is subsequently collected in a collection flask. The distillation residue remaining in the evaporator flask can be further processed or analyzed. As a rule, a vacuum pump is additionally provided for the generation of a vacuum in the evaporator flask and in the cooler to lower the boiling point, whereby the distillation can be accelerated and the distillation rate can be increased accordingly.

Rotary evaporators are, however, also used to dry powders of different consistencies and grain sizes. There is a problem here in that as the degree of drying of the powder located in the evaporator flask increases, powder dust is created that can rise, in particular together with the solvent vapor, and can thus enter into the cooler and into the vacuum system of the rotary system. To avoid a laborious cleaning of the cooler and possible damage to the vacuum pump, the powder is therefore frequently not completely dried, but the drying process is rather aborted at an earlier point in time at which the powder still has at least low residual moisture. The evaporator flask then has to be placed in a suitable furnace for a complete drying.

SUMMARY

It is the underlying object of the invention to enable a complete powder drying in a rotary evaporator without the aforesaid disadvantages occurring in the process.

This object is satisfied by a rotary evaporator having the features of claim 1 and in particular in that a filter that is connected upstream of the glass structure, and in particular upstream of the vapor tube, in particular in the direction of the vapor flow, is provided for the filtering of solids, in particular of a powder, from a vapor flow.

Such a filter is admittedly permeable for the respective solvent, but not for the powder to be dried. The powder can therefore be completely dried by the use of such a filter, with it simultaneously being ensured that the powder or the powder dust can in this process not enter into the glass apparatus, in particular into the cooler, and into the vacuum system arranged downstream of the vapor tube. Powder particles rising in the evaporator flask rather remain at the surface of the filter. A complete drying of a powder can thus take place in the rotary evaporator, i.e. the drying process can be completed in the rotary evaporator itself. A subsequent, separate end drying of the powder in a furnace or the like is not necessary.

The glass structure of the rotary evaporator arranged downstream of the vapor tube therefore also does not have to be cleaned after a carrying out of a complete powder drying. A cleaning of the vapor tube can additionally also be avoided with a filter connected upstream of the vapor tube. With a filter arranged in the vapor tube, the vapor tube also has to be cleaned. The glass structure comprises at least one cooler, preferably additionally one or more pieces of glass equipment that connect the cooler to the vapor tube and or to the vacuum system, and/or a collection flask.

Only the filter and, under certain circumstances, additionally the vapor tube have to be cleaned to clean the rotary evaporator. The filter is in particular arranged in the region of the interface between the rotary drive and the evaporator flask so that it is easily accessible, in particular since the evaporator flask anyway has to be removed for filling and after a powder drying. The glass structure connected downstream of the vapor tube can still also be a standard glass structure or a standard glassware set since on a provision of a filter it does not have to be especially configured for the reception of the filter. The filter can be cleaned or can be replaced with another filter. The filter is in particular configured as a component that is in particular separate from the vapor tube and/or from the rotary evaporator. The filter is preferably an optional accessory with which the rotary evaporator can selectively be provided to carry out a powder drying.

A powder drying previously had to be carried out in a comparatively gentle manner. A faster drying is possible with the filter provided in accordance with the invention.

The rotary evaporator is in particular configured such that the filter rotates along with the evaporator flask. A connection section for the evaporator flask that is attached to the rotary drive is preferably provided, with the filter being drive-effectively connected to the connection section. It is, however, generally also possible that the filter is configured as stationary. This could in particular be the case when the vapor tube is also configured as stationary and the filter is fastened to the stationary vapor tube. The filter can, however, also be provided in a rotary evaporator having a rotating vapor tube, e.g. when the evaporator flask is connected to the vapor tube via a ground glass joint.

In accordance with a preferred embodiment, the filter is fastened to a sealing device, in particular configured as a separate component, in particular a sealing disk having a leadthrough for the vapor tube, by which the vapor tube is sealed with respect to the connection section. This is in particular of advantage when the vapor tube is non-rotatable or stationary with respect to the axis of rotation.

The connection section can have a receiver for the evaporator flask, in particular a flask neck of the evaporator flask, into which the sealing device is inserted. The receiver can here have a receiver base and the sealing device can be arranged, in particular clamped, between the receiver base and a neck of the evaporator flask, in particular a flange-like connection point of the neck of the evaporator flask. The sealing device can be captively inserted into the receiver independently of a clamping by the evaporator flask.

In this respect, the sealing device can have a sealing ring carrier and a sealing ring having at least one peripheral sealing lip for a sealing contact to the vapor tube. The sealing ring can here be inserted into an annular recess of the sealing ring carrier and/or an annular recess of the receiver base.

The filter can be connected to the sealing device by a screw connection. In particular for this purpose, the sealing device can have a collar section, that is in particular peripheral, that is directed in the direction of the axis of rotation, and to which the filter is fastened, in particular screwed.

If the rotary evaporator is not used for powder drying and if a filter in accordance with the invention is thus not necessary, a further sealing device can be provided by which the vapor tube is sealable with respect to the connection section to which the filter cannot be fastened without further aids and that is usable with the rotary evaporator instead of the sealing device to which the filter is fastened.

The filter preferably projects, in particular starting from the aforesaid sealing device and/or from an interface between the vapor tube, between the vapor tube and the evaporator flask, into the evaporator flask, in particular into a flask neck of the evaporator flask. It is, however, generally also possible that the sealing device projects into the vapor tube. However, the inner cross-section of the vapor tube will typically be smaller than the inner cross-section of the flask neck of the evaporator flask so that a projection into the evaporator flask is preferred. In accordance with an embodiment, the filter is also connected upstream of the vapor tube when it extends from the interface between the vapor tube and the evaporator flask into the vapor tube.

The filter is preferably at least partly, in particular completely, arranged within the evaporator flask. The filter is then also easily visible and how much powder has already been deposited on the filter can be checked in a simple manner by a visual inspection.

In accordance with an embodiment, the filter is part of a filter unit that can be non-destructively dismantled into a plurality of parts. The filter can then be cleaned particularly easily.

The filter is preferably configured as an elongate hollow body, in particular as tubular. An elongate filter configured as a hollow body has a greater surface in comparison with an only disk-shaped or plate-like filter, i.e. the powder rising in the rotary evaporator and collecting at the filter can be distributed over a greater surface so that a clogging of the filter can also be avoided on a longer operation.

The filter can be provided at a front-face end with a connection section, in particular a connection flange, for fastening the filter and/or can be closed at a front-face end, that in particular projects into the evaporator flask, by a closure element, in particular by a cover. It can be ensured by the closure element that no powder enters into the glass structure arranged behind the evaporator flask or behind the vapor tube.

The filter is preferably produced from a porous material that is in particular sintered, in particular glass, a ceramic material, or plastic. The porous material can have pore sizes of, for example, 0.1 µm to 500 µm. The filter can therefore be a porous sintered filter, in particular of glass, preferably borosilicate glass. The filter can therefore be a frit. A frit is a filter composed of glass or a ceramic material that is used for filtering even very fine particles. The glass or the ceramic material is porous so that the matter to be filtered is caught in the pores as in a very fine screen. The filter can, however, generally also comprise a filter paper or the like.

A plurality of filters that differ from one another, in particular in design, dimensions, material and/or porosity, and that are selectively usable with the rotary evaporator can be provided for an adaptation to powders of different consistencies and/or grain sizes.

A plurality of filters connected one after the other can also be provided that are each part of a common, in particular multi-stage, filter unit. The plurality of filters can differ from one another, in particular in design, dimensions, material and/or porosity.

The present invention further relates to a filter for filtering solids from a vapor flow for a rotary evaporator having a rotary drive, having an evaporator flask rotatable about an axis of rotation by the rotary drive, having a vapor tube, and having a glass structure adjoining the vapor tube in the direction of the vapor flow, with the filter being able to be connected upstream of the glass structure, in particular upstream of the vapor tube. Further developments of the filter in accordance with the invention result in an analog manner from the corresponding further developments of the rotary evaporator in accordance with the invention.

A non-restrictive embodiment of the invention is illustrated in the drawing and will be described in the following. They are shown in a schematic representation.

DETAILED DESCRIPTION

Figure 1:
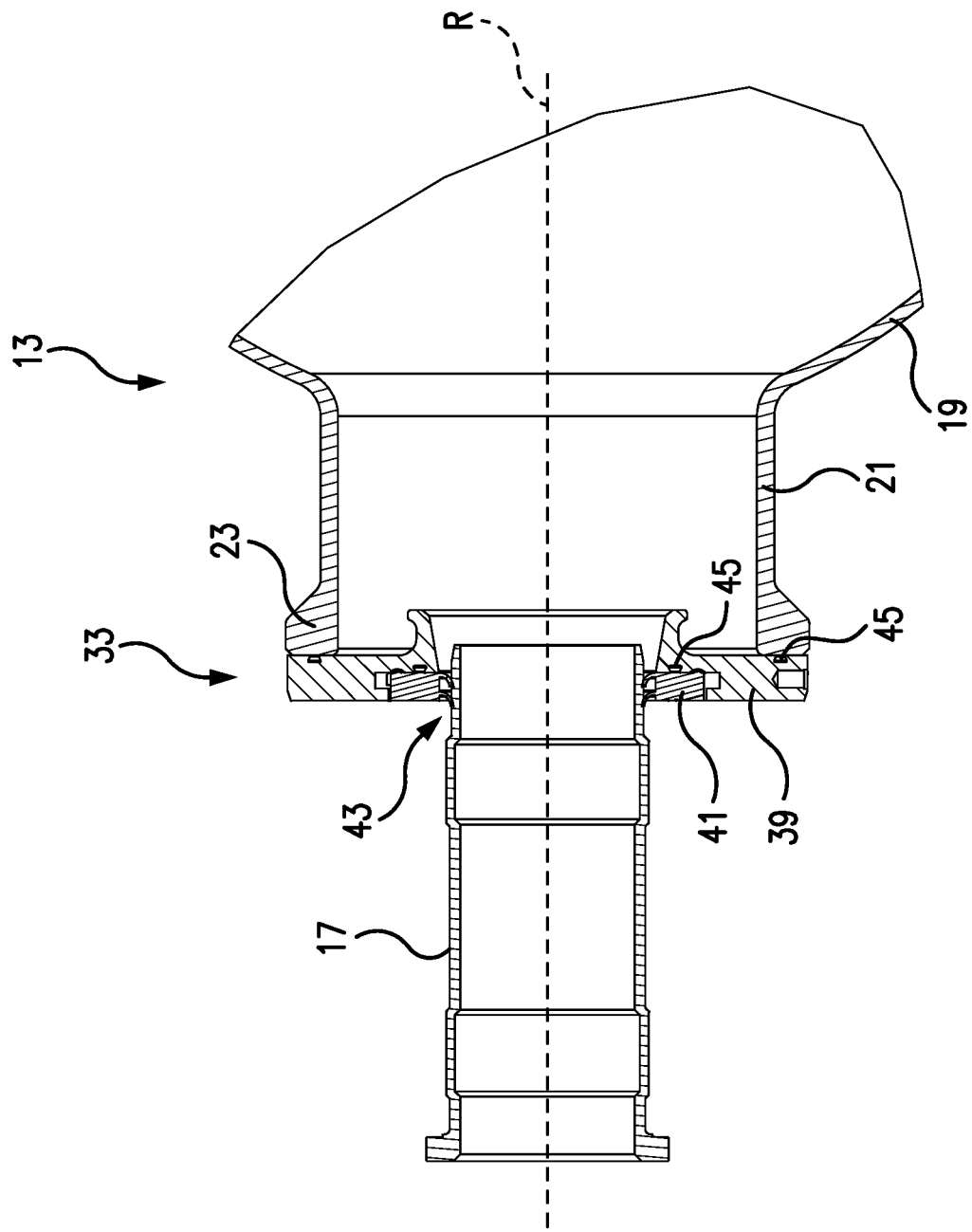
FIG. 1 depicts a longitudinal section through a connection section for an evaporator flask rotatable by a rotary drive of a rotary evaporator.

An evaporator flask 13 is shown in FIG. 1 that can be rotated about an axis of rotation R by a rotary drive, not shown, of a rotary evaporator. The evaporator flask 13 is suitable for receiving a liquid mixture or a powder to be dried and is completely produced from glass. During the operation of the rotary evaporator, evaporated solvent moves through a vapor tube 17 configured as a hollow glass shaft into a cooler, not shown, of the rotary evaporator. The vapor tube 17 is non-rotatable with respect to the axis of rotation R. The evaporator flask 13 comprises a belly 19 and a neck 21 that has a peripheral, flange-like connection point 23.

Figure 2:
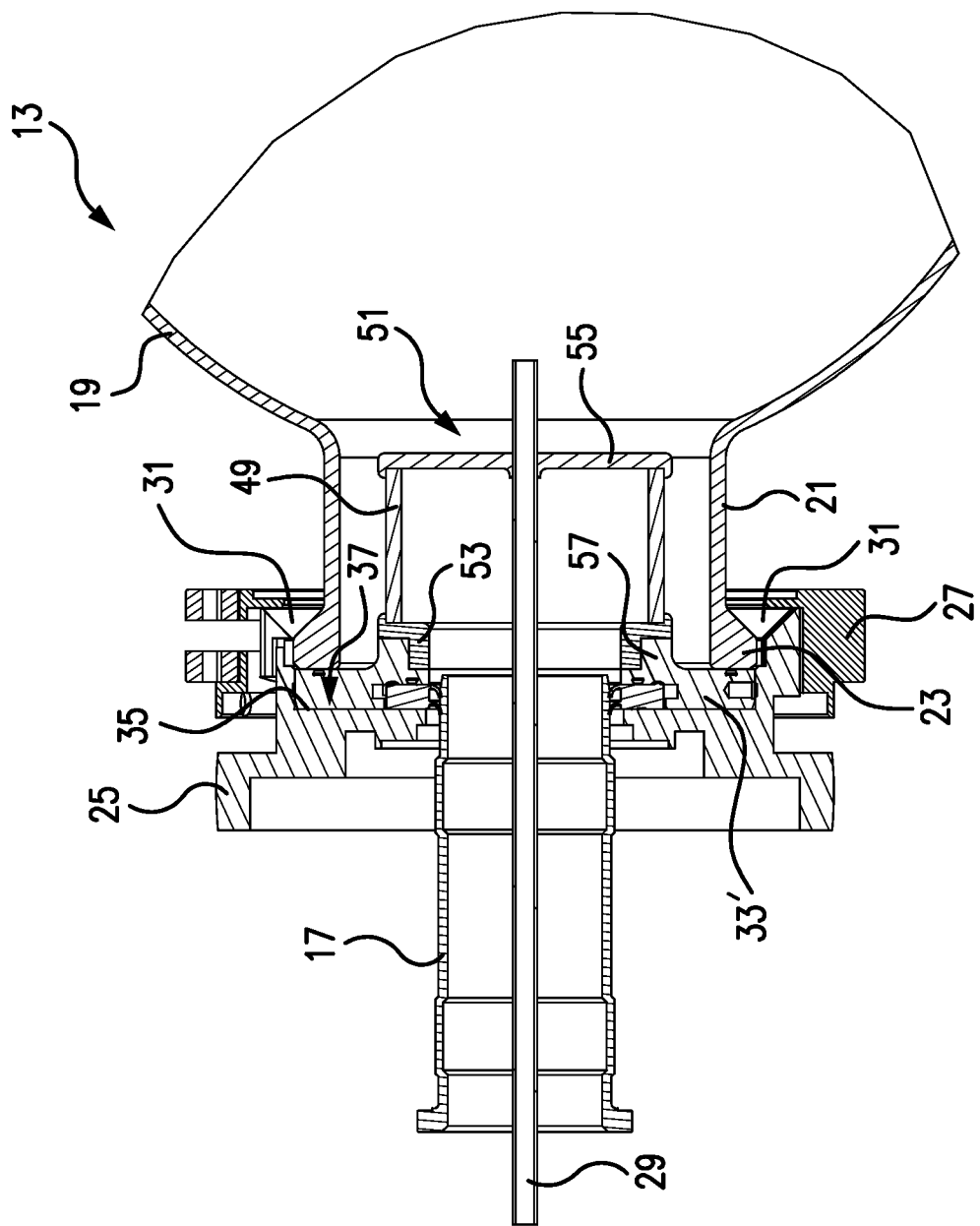
FIG. 2 depicts a filter in accordance with the invention.

The evaporator flask 13 is fastenable to a connection section 25 only shown in connection with FIG. 2 and fixedly connected to the rotary drive of the rotary evaporator, in particular by means of a retainer element 27 such as is known from DE 10 2014 110 343 A1. In accordance with this document, whose content is fully referenced here and whose content is included by reference in the disclosure content of the present invention, clamping elements 31 are moved radially inwardly on the rotation of the retainer element 27 relative to the connection section 25 to hold the flange-like connection point 23 and thus the evaporator flask 13 tight to the connection section 23 in a shape-matched and/or force-fitting manner.

In this respect, a sealing device 33 configured as a sealing disk is provided that has a central leadthrough through which the vapor tube 17 projects and that is clamped between the flange-like connection point 23 of the evaporator flask 13 and the connection section 25 on the fastening of the evaporator flask 13 to the connection section 25.

The sealing device 33 comprises a sealing ring carrier 39 and a sealing ring 41 inserted into an annular recess of the sealing ring carrier 39. The sealing ring 41 is manufactured from an elastically deformable material, in particular from PTFE, and is provided with at least one sealing lip, two sealing lips in the embodiment shown that are spaced apart from one another in the axial direction and are radially peripheral. The sealing ring carrier 39 is likewise preferably produced from PTFE. Respective O rings 45 are arranged at the two axial end faces of the sealing ring carrier 39. The two sealing lips 43 sealingly contact the outer side of the vapor tube 17. Due to their curvature, the sealing lips 43 contact the vapor tube 17 even more strongly when a vacuum is applied to the evaporator flask 13 during the operation of the rotary evaporator.

To prevent fine dust particles of the powder from being taken along with the solvent vapor that evaporates from the moist powder during a powder drying and thus entering into the cooler and the vacuum system of the rotary evaporator, a filter 49 is used to filter dust particles from a vapor flow. The filter 49 is in this process fastened to a sealing device 33' that—except for the section that serves for the fastening of the filter 49—is substantially identical to the sealing device 33 shown in FIG. 1, as can be seen from FIG. 2.

On a powder drying, the sealing device 33 shown in FIG. 1 is replaced with the sealing device 33' (having the filter 49 fastened thereto) shown in FIG. 2. The filter 49 then extends, starting from the sealing device 33', in the direction of the evaporator flask 13 and projects into it. The filter 49 is here completely arranged within the evaporator flask 13. Since the filter 49 is connected upstream of the vapor tube 17 in the direction of the vapor flow, it can be avoided that, on a drying of powder, powder dust penetrates into the vapor tube 17 and into the glass structure arranged behind the vapor tube 17 and contaminates it. A cleaning of the glass structure is therefore not necessary, but can rather be restricted to the filter 49.

The filter 49 is drive-effectively connected to the connection section 25 via the sealing device 33', i.e. with a driven rotary drive, the filter 49 rotates along with the rotary drive, the connection section 25 and the rotary evaporator 13.

The filter 49 is configured as a filter tube and is part of a filter unit 51. At its left end in FIG. 2, the filter 49 is provided with a flange 53 via which the filter unit 51 is fastened to the sealing device 33'. The flange 53 can here be provided with an external thread that is screwed into an internal thread of a peripheral collar 57 that is formed at the sealing device 33' and that faces in the direction of the axis of rotation R. At its right end in FIG. 2, the filter 49 is closed by a cover 55 so that no powder can enter through this end side into the vapor tube 17 and into the glass structure connected downstream of the vapor tube 17. The filter unit 51 can be non-destructively dismantled into its three parts 49, 53, 55 so that the filter 49 is in particular simply cleanable.

The filter 49 is configured as a glass filter. The filter 49 here comprises a sintered porous material, in particular an open-pore borosilicate glass that has high chemical resistance. A different material such as a ceramic material or plastic is, however, generally also suitable. Furthermore, a plurality of such filters can be provided that, however, differ from one another, for example in their porosity, to be used with different powders of different consistencies and/or grain sizes.

A multi-stage filter unit having a plurality of filters connected behind one another can also be provided. The filters connected behind one another can differ in their porosity. E.g. the pore size can decrease or increase stepwise in the direction of the vapor flow. The plurality of filters can furthermore be produced from different materials.

It can be ensured by the arrangement of the filter in accordance with the invention that on a complete powder drying in a rotary evaporator, no powder dust can enter into the vapor tube or into the glass structure connected downstream of the vapor tube so that no laborious cleaning of the rotary evaporator is required.

REFERENCE NUMERAL LIST

13 evaporator flask
17 vapor tube
19 belly
21 neck
23 connection point
25 connector section
27 retainer element
29 line
31 clamping element
33 sealing device
33' sealing device
35 base
37 receiver
39 sealing ring carrier
41 sealing ring
43 sealing lip
45 O ring
49 filter
51 filter unit
53 flange
55 cover
57 collar
R axis of rotation

The invention claimed is:

1. A rotary evaporator, the rotary evaporator comprising:
a rotary drive;
an evaporator flask rotatable about an axis of rotation by the rotary drive;
a vapor tube;
a glass structure adjoining a vapor tube in the direction of the vapor flow;
a filter connected upstream of the glass structure for filtering solids from the vapor flow;
a connection section attached to the rotary drive, wherein the connection section includes a receiver for the evaporator flask; and
a sealing device, wherein the sealing device is inserted into the receiver of the connection section,
wherein the filter is drive-effectively connected to the connection section, and
wherein the filter is fastened to the sealing device such that the vapor tube is sealed with respect to the connection section by the sealing device.

2. The rotary evaporator of claim 1, wherein the filter is connected upstream of the vapor tube.

3. The rotary evaporator of claim 1, wherein the rotary evaporator is configured such that the filter rotates along with the evaporator flask.

4. The rotary evaporator of claim 1, wherein the sealing device is a sealing disk having a leadthrough for the vapor tube.

5. The rotary evaporator of claim 1, wherein the receiver has a receiver base and wherein the sealing device is arranged between the receiver base and a neck of the evaporator flask.

6. The rotary evaporator of claim 5, wherein the sealing device is arranged between the receiver base and a flange-like connection point of the neck of the evaporator flask.

7. The rotary evaporator of claim 1, wherein the filter is connected to the sealing device by a screw connection.

8. The rotary evaporator of claim 1, wherein the sealing device has a collar section that is directed in the direction of the axis of rotation and to which the filter is fastened.

9. The rotary evaporator of claim 1, further comprising:
a further sealing device by which the vapor tube is sealable with respect to the connection section to which the filter is not fastenable without further aids and that is usable with the rotary evaporator instead of the sealing device to which the filter is fastened.

10. The rotary evaporator of claim 1, wherein the filter projects into the evaporator flask.

11. The rotary evaporator of claim 1, wherein the filter is arranged at least partly within the evaporator flask.

12. The rotary evaporator of claim 1, wherein the filter is part of a filter unit that can be non-destructively dismantled into a plurality of parts.

13. The rotary evaporator of claim 1, wherein the filter is configured as an elongate hollow body.

14. The rotary evaporator of claim 1, wherein the filter is provided at a front-face end with a connection section for fastening the filter and/or is closed at a front-face end by a closure element.

15. The rotary evaporator of claim 1, wherein the filter is produced from a porous material.

16. The rotary evaporator of claim 1, wherein a plurality of filters are provided that differ from one another and that are selectively usable with the rotary evaporator.

17. The rotary evaporator of claim 1, further comprising:
a plurality of filters connected one after the other that are each part of a common filter unit.

\* \* \* \* \*